US009088751B2

(12) United States Patent  (10) Patent No.: US 9,088,751 B2
Tanaka  (45) Date of Patent: Jul. 21, 2015

(54) CONTROL DEVICE, IMAGE FORMING APPARATUS, AND CONTROL METHOD FOR CONTROLLING A TONER-DENSITY-RELATED VALUE OF TONER IN DEVELOPER

(75) Inventor: Satoshi Tanaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 269 days.

(21) Appl. No.: 13/301,507

(22) Filed: Nov. 21, 2011

(65) Prior Publication Data

US 2012/0250097 A1  Oct. 4, 2012

(30) Foreign Application Priority Data

Mar. 28, 2011  (JP) .................................. 2011-070257

(51) Int. Cl.
*H04N 1/40* (2006.01)
*H04N 1/60* (2006.01)

(52) U.S. Cl.
CPC ...................................... *H04N 1/60* (2013.01)

(58) Field of Classification Search
None
See application file for complete search history.

(56) References Cited

U.S. PATENT DOCUMENTS

| 5,275,904 | A | * | 1/1994 | Shimizu et al. ............ 430/108.2 |
| 5,819,132 | A | * | 10/1998 | Hirobe ............................ 399/49 |
| 5,839,018 | A | * | 11/1998 | Asanuma et al. ............... 399/43 |
| 5,987,272 | A | * | 11/1999 | Maeda et al. ................... 399/58 |
| 6,055,388 | A | * | 4/2000 | Watanabe et al. ............... 399/58 |
| 6,377,762 | B2 | * | 4/2002 | Kobayashi et al. ............. 399/46 |
| 6,501,916 | B2 | * | 12/2002 | Suzuki ............................ 399/30 |
| 7,352,977 | B2 | * | 4/2008 | Nakano et al. .................. 399/30 |
| 7,515,844 | B2 | * | 4/2009 | Tanaka et al. ................... 399/59 |
| 7,619,791 | B2 | * | 11/2009 | Itoyama et al. ............... 358/504 |

FOREIGN PATENT DOCUMENTS

JP  2006-154582 A  6/2006

* cited by examiner

*Primary Examiner* — Steven Kau
(74) *Attorney, Agent, or Firm* — Sughrue Mion, PLLC

(57) ABSTRACT

A control device includes a toner-density-related value identifying unit, a supply-amount-related value identifying unit, and a correcting unit. The toner-density-related value identifying unit identifies a toner-density-related value indicating the ratio of toner in developer including toner and carrier and contained in a developing unit that contains and agitates the developer. The supply-amount-related value identifying unit identifies the supply-amount-related value of developer to the developing unit. The correcting unit corrects the toner-density-related value identified by the toner-density-related value identifying unit in accordance with the supply-amount-related value identified by the supply-amount-related value identifying unit. The supply-amount-related value identifying unit estimates the supply-amount-related value on the basis of the consumption-amount-related value of developer.

9 Claims, 8 Drawing Sheets

CONTROL DEVICE, IMAGE FORMING APPARATUS, AND CONTROL METHOD FOR CONTROLLING A TONER-DENSITY-RELATED VALUE OF TONER IN DEVELOPER

CROSS-REFERENCE TO RELATED APPLICATIONS

This application is based on and claims priority under 35 USC 119 from Japanese Patent Application No. 2011-070257 filed Mar. 28, 2011.

BACKGROUND

The present invention relates to a control device, an image forming apparatus, and a control method.

SUMMARY

According to an aspect of the invention, there is provided a control device including a toner-density-related value identifying unit, a supply-amount-related value identifying unit, and a correcting unit. The toner-density-related value identifying unit identifies a toner-density-related value indicating the ratio of toner in developer including toner and carrier and contained in a developing unit that contains and agitates the developer. The supply-amount-related value identifying unit identifies the supply-amount-related value of developer to the developing unit. The correcting unit corrects the toner-density-related value identified by the toner-density-related value identifying unit in accordance with the supply-amount-related value identified by the supply-amount-related value identifying unit. The supply-amount-related value identifying unit estimates the supply-amount-related value on the basis of the consumption-amount-related value of developer.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the present invention will be described with reference to the drawings.

Configuration of Exemplary Embodiment

Figure 1:
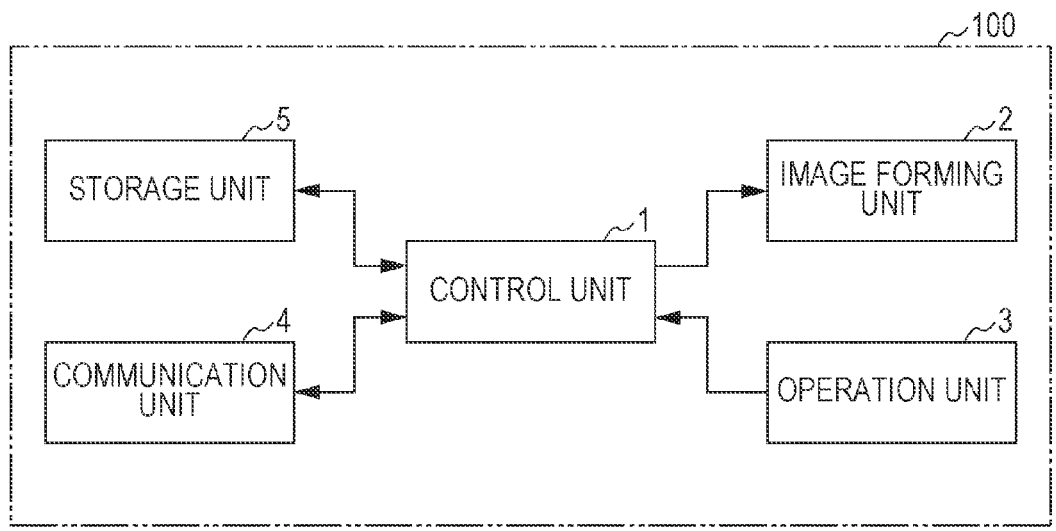
FIG. 1 illustrates the configuration of an image forming apparatus according to an exemplary embodiment of the present invention.

FIG. 1 illustrates the configuration of an image forming apparatus 100 according to an exemplary embodiment of the present invention. As illustrated in FIG. 1, the image forming apparatus 100 includes a control unit 1, an image forming unit 2, an operation unit 3, a communication unit 4, and a storage unit 5.

The control unit 1 includes a central processing unit (CPU), a read only memory (ROM), and a random access memory (RAM). The CPU of the control unit 1 executes a control program stored in the ROM to control the individual units of the image forming apparatus 100. In particular, in this exemplary embodiment, the CPU executes a program for a process for controlling the toner-density-related value, which will be described later, to control the individual units of the image forming apparatus 100. Furthermore, the CPU executes a program for a process for updating a correction value, which will be described later, to control the individual units of the image forming apparatus 100.

The image forming unit 2 forms, using toner as a coloring material, images on a recording medium. The recording medium is, for example, recording paper. However, the recording medium may be a sheet made of plastic, such as an overhead projector (OHP) sheet, or a sheet made of a different material. The image forming unit 2 employs an area-ratio gray-scale method. The image forming unit 2 forms images using toner of four colors, yellow (Y), magenta (M), cyan (C), and black (K), in accordance with an eletrophotographic process.

The operation unit 3 includes buttons or the like. In accordance with an operation instruction from a user, the operation unit 3 supplies operation information indicating the operation instruction to the control unit 1. The communication unit 4 includes an interface used for transmitting and receiving data to and from an external apparatus. The storage unit 5 includes a memory such as a hard disk drive (HDD). The storage unit 5 stores, for example, image data to be used for forming an image.

Figure 2:
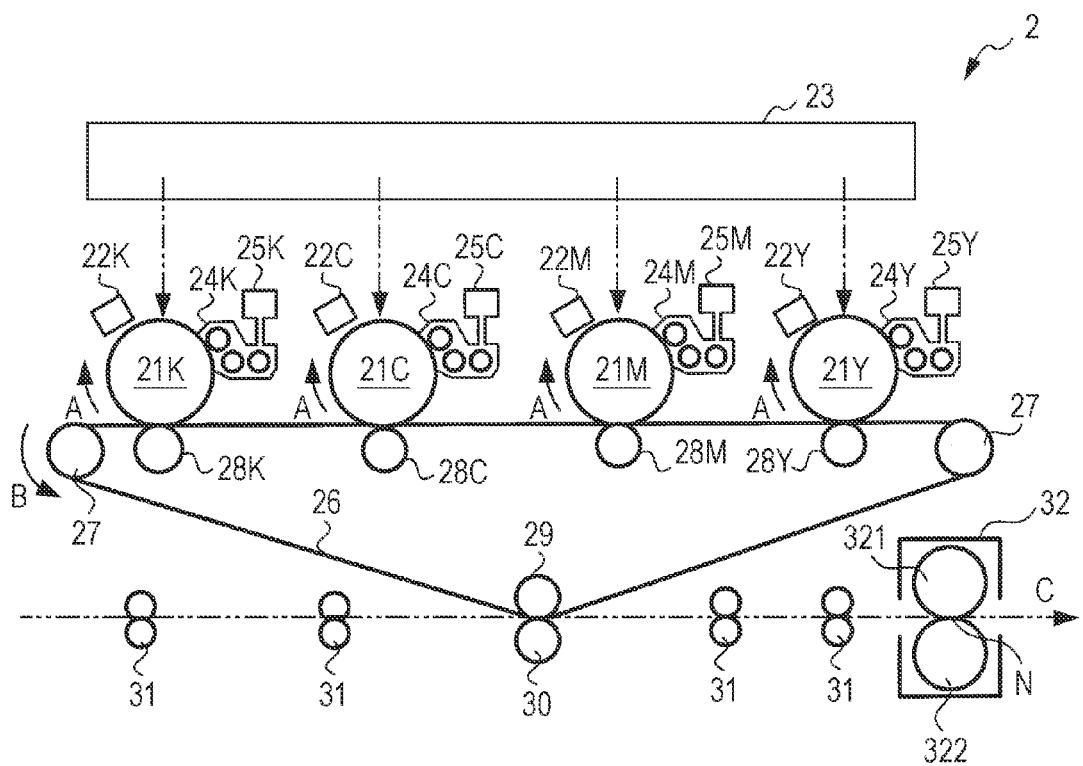
FIG. 2 illustrates the configuration of the image forming unit.

FIG. 2 illustrates the configuration of the image forming unit 2. In FIG. 2, an alphabetical character added to the end of each reference number represents the color of toner handled by the element to which the reference number is assigned. Elements provided with the same reference number and different alphabetical characters added to the reference numbers thereof have the same configuration but handle toner of different colors. In the explanation provided below, alphabetical characters added to the end of the reference numbers will be omitted unless there is a need to distinguish the elements from each other.

In FIG. 2, recording paper is conveyed in the direction of broken-line arrow C in the image forming apparatus 100, and an image is formed on the recording paper.

A photoreceptor drum 21 is a cylindrical member and a photoconductive layer is arranged on the surface of the photoreceptor drum 21. The photoreceptor drum 21 carries an electrostatic latent image formed on the surface of the photoreceptor drum 21. When the photoreceptor drum 21 is in contact with an intermediate transfer belt 26, the photoreceptor drum 21 rotates in the direction of arrow A in FIG. 2 around the central axis of the cylindrical shape in accordance with the movement of the intermediate transfer belt 26. The photoreceptor drum 21 is an example of an "image carrier" according to an exemplary embodiment of the present invention.

A charging device 22 is, for example, of scorotron type. The charging device 22 charges the photoconductive layer of the photoreceptor drum 21 to a specific potential. An exposure device 23 irradiates the photoreceptor drum 21 charged by the charging device 22 with light, and an electrostatic latent image corresponding to light exposure is formed. The exposure device 23 performs the irradiation of light on the basis of image data output from the control unit 1. The exposure device 23 is an example of an "exposure unit" according to an exemplary embodiment of the present invention.

The RAM of the control unit 1 includes counters that count the number of effective pixels forming image data output to the exposure device 23. The number of effective pixels means the number of pixels forming an electrostatic latent image to be formed on the photoreceptor drum 21 due to the light exposure by the exposure device 23, that is, the number of pixels serving as a target of development using toner. The number of effective pixels may include the number of pixels forming an image formed for the adjustment of the image quality by the image forming apparatus 100 as well as the number of pixels forming an image formed in accordance with an instruction from an external apparatus. The control unit 1 counts the number of effective pixels to identify the consumption-amount-related value of developer by a developing device 24.

The control unit 1 controls a dispensing motor, which will be described later, in accordance with the identified consumption-amount-related value of developer, and supplies developer to the developing device 24. A supply-amount-related value may be calculated using a consumption-amount-related value.

The RAM of the control unit 1 includes counters CT1 to CT3 that count the number of pages of recording medium on which image formation is performed by the image forming unit 2 on the basis of image data output to the exposure device 23. The counters CT1 to CT3 are reset at different timings.

The developing device 24 contains two-component developer including toner of corresponding one of yellow, magenta, cyan, and black and magnetic carrier such as ferrite powder. The developing device 24 causes toner to be adhered to a latent image formed on the photoreceptor drum 21, and a toner image is formed. The developing device 24 is connected to a toner cartridge 25 via a developer supply path, and the developing device 24 receives the supply of the developer from the toner cartridge 25 in accordance with rotation driving of the dispensing motor, which is not illustrated. The dispensing motor is an example of a "supply unit" according to an exemplary embodiment of the present invention. The developer supplied to the developing device 24 by the dispensing motor may be only toner or may include both toner and carrier.

The RAM of the control unit 1 includes timers TM1 and TM2 that count the driving time of the dispensing motor. The timers TM1 and TM2 are reset at different timings. The driving time counted by the timers TM1 and TM2 may include the driving time when the image forming apparatus 100 forms an image for adjusting the image quality as well as the driving time when an image is formed in accordance with an instruction from an external apparatus. The control unit 1 counts the driving time of the dispensing motor to identify the supply-amount-related value of developer to the developing device 24. The control unit 1 is an example of a "supply-amount-related value identifying unit" according to an exemplary embodiment of the present invention. The developing device 24 is an example of a "developing unit" according to an exemplary embodiment of the present invention. Here, the term "identifying" may represent an operation for acquiring a certain value by using various methods such as "calculating".

Figure 3:
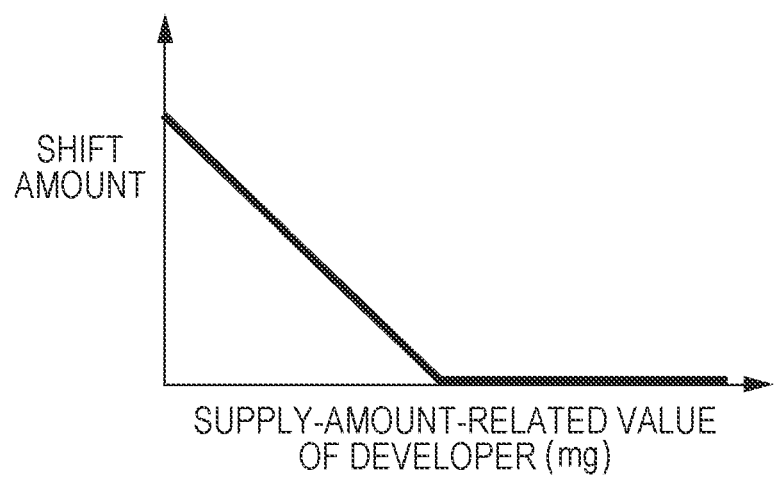
FIG. 3 illustrates an example of the relationship between the supply-amount-related value of developer and the shift amount.

A look up table LUT1 is stored in advance in the storage unit 5. In the look up table LUT1, the supply-amount-related value of developer to the developing device 24 is associated with the shift amount for shifting a correction value toward a plus side, which will be described later. FIG. 3 illustrates an example of the relationship between the values stored in the look up table LUT1. As illustrated in FIG. 3, in the look up table LUT1, the supply-amount-related value of developer and the shift amount exhibit a negative correlation until the supply-amount-related value of developer reaches a specific value. Then, after the supply-amount-related value of developer reaches the specific value, the shift amount is maintained to be "0".

Figure 4:
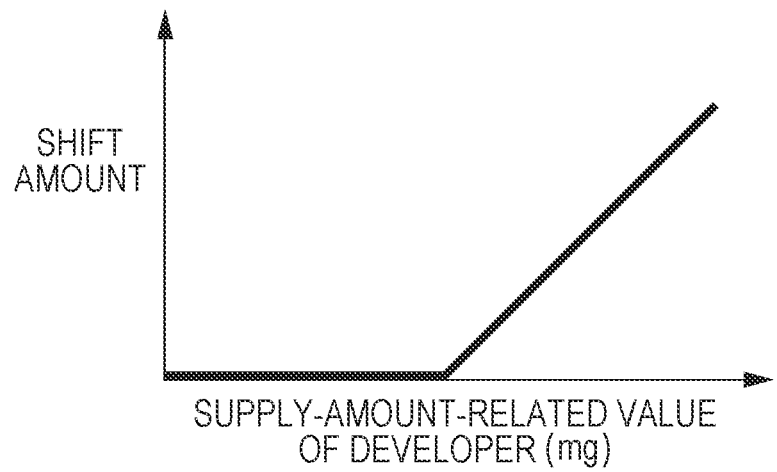
FIG. 4 illustrates an example of the relationship between the supply-amount-related value of developer and the shift amount.

Furthermore, a look up table LUT2 is stored in advance in the storage unit 5. In the look up table LUT2, the supply-amount-related value of developer to the developing device 24 is associated with the shift amount for shifting the correction value toward a minus side, which will be described later. FIG. 4 illustrates an example of the relationship between the values stored in the look up table LUT2. As illustrated in FIG. 4, in the look up table LUT2, the shift amount is maintained to be "0" until the supply-amount-related value of developer reaches a specific value. Then, after the supply-amount-related value of developer reaches the specific value, the shift amount increases as the supply-amount-related value of developer increases.

The intermediate transfer belt 26 is an endless belt member and rotates in the direction of arrow B in FIG. 2 while being in contact with a rotating roller 27, a first transfer roller 28, and a backup roller 29. The rotating roller 27 is a cylindrical member that supports the movement of the intermediate transfer belt 26 and rotates around the center of the cylindrical shape. The first transfer roller 28 is a cylindrical member that faces the photoreceptor drum 21 with the intermediate transfer belt 26 therebetween. Due to a potential difference generated between the first transfer roller 28 and the photoreceptor drum 21, the first transfer roller 28 transfers toner on the surface of the photoreceptor drum 21 to the surface of the intermediate transfer belt 26.

A second transfer roller 30 transfers to recording paper an image obtained by development by the developing device 24. The second transfer roller 30 is a cylindrical member that faces the backup roller 29 with the intermediate transfer belt 26 therebetween. Due to a potential difference generated between the second transfer roller 30 and the backup roller 29, the second transfer roller 30 transfers toner on the surface of the intermediate transfer belt 26 to the surface of the recording paper. The second transfer roller 30 is an example of a "transfer unit" according to an exemplary embodiment of the present invention.

A conveying roller 31 is a cylindrical member that is driven by a driving device, which is not illustrated, and conveys recording paper in the direction of broken-line arrow C in FIG. 2. The conveying roller 31 is rotated in such a manner that recording paper is conveyed at a predetermined conveyance speed.

A fixing device 32 includes a fixing roller 321 and a pressure roller 322. The fixing device 32 performs fixing processing for applying heat and pressure to an area N, which is sandwiched between the fixing roller 321 and the pressure roller 322, of conveyed recording paper, to which an image has been transferred, and an image is fixed to the recording paper.

Figure 5:
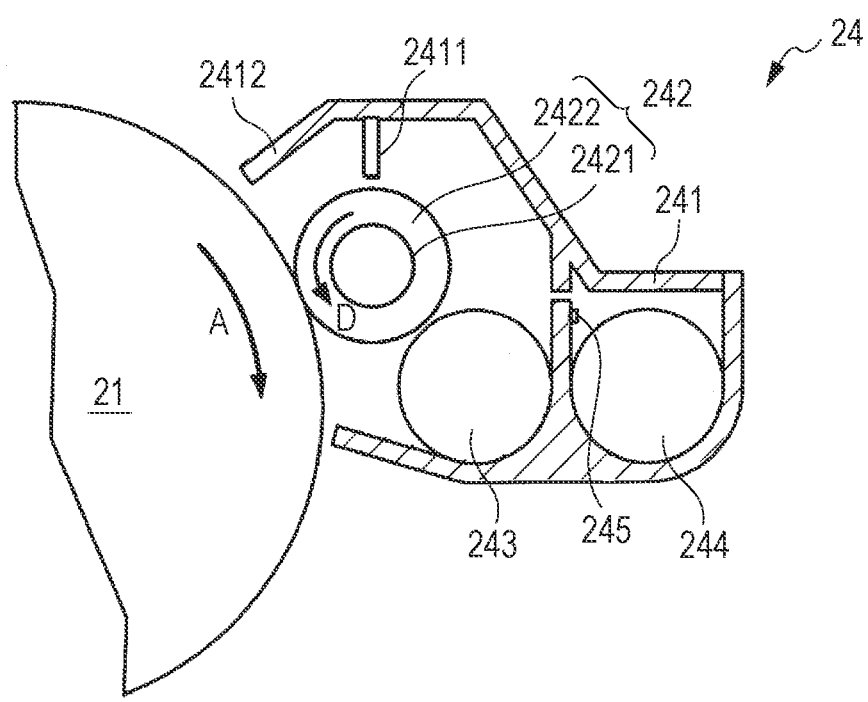
FIG. 5 illustrates, in an enlarged manner, a developing device and peripheral devices.

FIG. 5 illustrates, in an enlarged manner, the developing device 24 and peripheral devices.

As illustrated in FIG. 5, the developing device 24 includes a case 241 containing a developing roller 242, a supply roller 243, an agitation member 244, and a density sensor 245.

The developing roller 242 is a cylindrical member provided in an opening portion of the case 241 near the photoreceptor drum 21. The developing roller 242 includes a magnet roller 2421 fixed inside the developing roller 242 and a developing sleeve 2422 rotatably provided on the periphery of the magnet roller 2421. The magnet roller 2421 generates a magnetic field for causing developer to be retained on the surface of the developing roller 242. The developing sleeve 2422 is a non-magnetic sleeve and is rotated in the direction of arrow D in FIG. 5 in a state where a developing bias at a predetermined developing potential is being applied to the magnet roller 2421. The developing potential is, for example, −600 V.

At the time of rotation, the developing sleeve 2422 retains developer on the surface thereof due to the magnetic attraction force of the magnet roller 2421. The retained developer forms a so-called magnetic brush, in which the developer is arranged in a fascicular fashion along the magnetic line of force, due to the magnetic force applied by the magnet roller 2421. The layer thickness of the magnetic brush is regulated by a layer thickness regulating member 2411. A covering unit 2412 configuring the case 241 prevents toner from scattering from the developing roller 242 or the photoreceptor drum 21.

The supply roller 243 is a cylindrical member provided further inward than the developing roller 242 inside the case 241. The supply roller 243 supplies developer to the surface of the developing roller 242 while agitating the developer inside the case 241. The agitation member 244 is a spiral-shaped rotational body provided further inward than the supply roller 243. The agitation member 244 agitates and conveys the developer inside the case 241. The density sensor 245 is a sensor provided on a partition board which separates between the supply roller 243 and the agitation member 244. The density sensor 245 measures the toner-density-related value inside the case 241 (the toner ratio in developer). More specifically, the density sensor 245 measures the magnetic permeability for calculating the toner-density-related value. The density sensor 245 outputs a signal indicating the measured magnetic permeability to the control unit 1. The control unit 1 identifies the toner-density-related value inside the developing device 24 on the basis of the signal. The control unit 1 is an example of a "toner-density-related value identifying unit" according to an exemplary embodiment of the present invention. Here, the term "identifying" may represent an operation for acquiring a certain value by using various methods such as "sensing", "measuring", "detecting", and "calculating". Identifying a toner-density-related value is not necessarily directly obtaining the toner density. Methods such as, for example, measuring the magnetic permeability of developer using a magnetic permeability sensor may be employed for identifying a toner-density-related value.

Operation of Exemplary Embodiment

Figure 6:
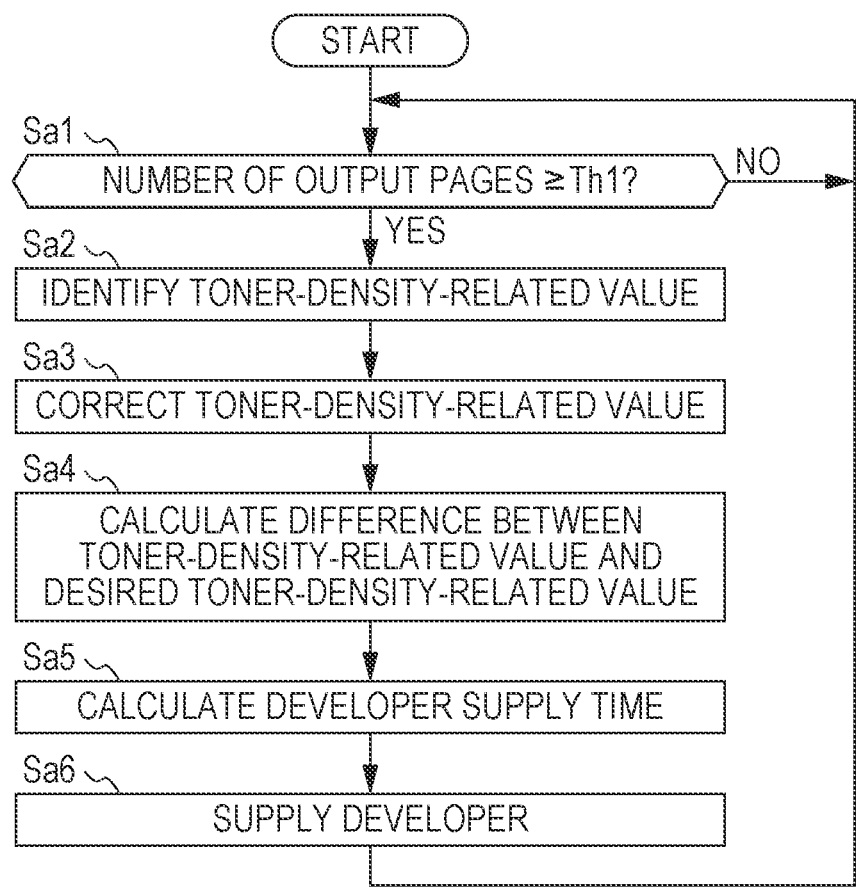
FIG. 6 is a flowchart illustrating a process for controlling the toner-density-related value according to this exemplary embodiment.

FIG. 6 is a flowchart illustrating a process for controlling the toner-density-related value according to an exemplary embodiment of the present invention. This process is implemented when a program for this process stored in the ROM of the control unit 1 is executed by the CPU. This process is performed in parallel with an image forming process performed by the image forming unit 2. This process may be performed for individual developing devices 24 for corresponding colors.

In step Sa1, the control unit 1 determines whether or not the number of pages of recording medium on which image formation has been performed by the image forming unit 2 is equal to or greater than a threshold Th1 (step Sa1). More specifically, the control unit 1 determines whether or not the value of the counter CT1 stored in the RAM of the control unit 1 is equal to or greater than the threshold Th1. The threshold Th1 is, for example, a threshold stored in the storage unit 5 and is, for example, "10".

If the determination in step Sa1 is negative (NO in step Sa1), the control unit 1 repeats the determination in step Sa1. If the determination in step Sa1 is affirmative (YES in step Sa1), the control unit 1 identifies the toner-density-related value inside the developing device 24 on the basis of a signal output from the density sensor 245 (step Sa2). The control unit 1 resets the counter CT1.

Then, the control unit 1 corrects the toner-density-related value identified in step Sa2 (step Sa3). More specifically, the control unit 1 reads a correction value stored in the RAM of the control unit 1, and performs correction for subtracting the correction value from the identified toner-density-related value. The correction value is updated in accordance with the supply-amount-related value of developer, as described later. The control unit 1 is an example of a "correcting unit" according to an exemplary embodiment of the present invention.

Then, the control unit 1 calculates the difference between the toner-density-related value corrected in step Sa3 and a desired toner-density-related value (step Sa4). The desired toner-density-related value is, for example, a value stored in the storage unit 5, and is set as a reference value for controlling the toner-density-related value inside the developing device 24 to be maintained constant.

The control unit 1 multiplies the difference calculated in step Sa4 by a predetermined coefficient C1 to calculate a developer supply time (step Sa5). The predetermined coefficient C1 is, for example, a value stored in the storage unit 5, and is set for calculating the driving time of the dispensing motor used for resetting the difference between the toner-density-related value inside the developing device 24 and the desired toner-density-related value to 0.

Then, the control unit 1 drives the dispensing motor during the time calculated in step Sa5 to cause the toner cartridge 25 to supply developer to the developing device 24 (step Sa6). The control unit 1 is an example of a "control unit" according to an exemplary embodiment of the present invention.

The process for controlling the toner-density-related value according to this exemplary embodiment is performed as described above.

Figure 7:
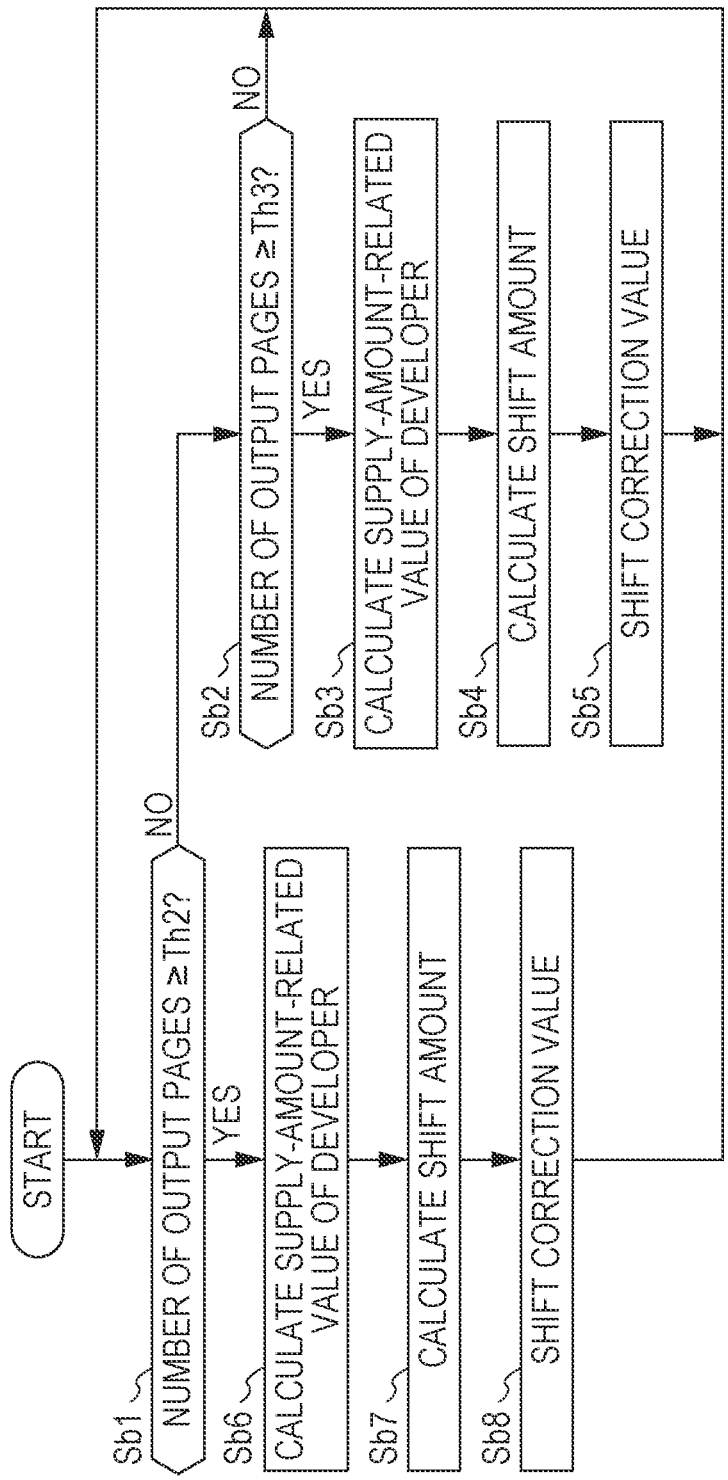
FIG. 7 is a flowchart illustrating a process for updating a correction value according to this exemplary embodiment.

A method for updating the correction value described above will now be explained with reference to FIG. 7. FIG. 7 is a flowchart illustrating a process for updating the correction value according to this exemplary embodiment.

The update process illustrated in the flowchart illustrated in FIG. 7 is implemented when a program for this process stored in the ROM of the control unit 1 is executed by the CPU. This process is performed in parallel with the image forming process performed by the image forming unit 2. This process may be performed for individual developing devices 24 for corresponding colors.

In step Sb1, the control unit 1 determines whether or not the number of pages of recording medium on which image formation has been performed by the image forming unit 2 is equal to or greater than a threshold Th2 (step Sb1). More specifically, the control unit 1 determines whether or not the value of the counter CT2 stored in the RAM of the control unit 1 is equal to or greater than the threshold Th2. The threshold Th2 is, for example, a threshold stored in the storage unit 5 and is, for example, "7".

If the determination in step Sb1 is negative (NO in step Sb1), the control unit 1 determines whether or not the number of pages of recording medium on which image formation has been performed by the image forming unit 2 is equal to or greater than a threshold Th3 (step Sb2). More specifically, the control unit 1 determines whether or not the value of the counter CT3 stored in the RAM of the control unit 1 is equal to or greater than the threshold Th3. The threshold Th3 is, for example, a threshold stored in the storage unit 5 and is, for example, "3". The threshold Th3 is set to be smaller than the threshold Th2.

If the determination in step Sb2 is negative (NO in step Sb2), the control unit 1 repeats the determination in step Sb1. If the determination in step Sb2 is affirmative (YES in step Sb2), the control unit 1 calculates the supply-amount-related value of developer from the toner cartridge 25 to the developing device 24 (step Sb3). More specifically, the control unit 1 reads, from the timer TM1 stored in the RAM of the control unit 1, the integrated value of the driving time of the dispensing motor. Then, the control unit 1 multiplies the read integrated value by a predetermined coefficient C2 to calculate the supply-amount-related value of developer from the toner cartridge 25 to the developing device 24. The predetermined coefficient C2 is, for example, a coefficient stored in the storage unit 5, and is set in advance for calculating the supply-amount-related value of developer on the basis of the integrated value of the driving time of the dispensing motor.

The control unit 1 also resets the counter CT3 and the timer TM1.

The control unit 1 identifies the shift amount for shifting the correction value stored in the RAM toward a minus side (step Sb4). More specifically, the control unit 1 refers to the look up table LUT2 stored in the storage unit 5 to identify the shift amount corresponding to the supply-amount-related value of developer calculated in step Sb3.

Then, the control unit 1 shifts the correction value stored in the RAM toward the minus side by the shift amount identified in step Sb4 (step Sb5). The correction value stored in the RAM is not less than 0. The control unit 1 is an example of a "correction value updating unit" according to an exemplary embodiment of the present invention.

If the determination in step Sb1 is affirmative (YES in step Sb1), the control unit 1 calculates the supply-amount-related value of developer from the toner cartridge 25 to the developing device 24 (step Sb6). More specifically, the control unit 1 reads, from the timer TM2 stored in the RAM of the control unit 1, the integrated value of the driving time of the dispensing motor. Then, the control unit 1 multiplies the read integrated value by the predetermined coefficient C2 to calculate the supply-amount-related value of developer from the toner cartridge 25 to the developing device 24.

The control unit 1 also resets the counter CT2 and the timer TM2.

Then, the control unit 1 identifies the shift amount for shifting the correction value stored in the RAM toward a plus side (step Sb7). More specifically, the control unit 1 refers to the look up table LUT1 stored in the storage unit 5 to identify the shift amount corresponding to the supply-amount-related value of developer calculated in step Sb6.

Then, the control unit 1 shifts the correction value stored in the RAM toward the plus side by the shift amount identified in step Sb7 (step Sb8).

The process for updating the correction value according to this exemplary embodiment is performed as described above.

Figure 8:
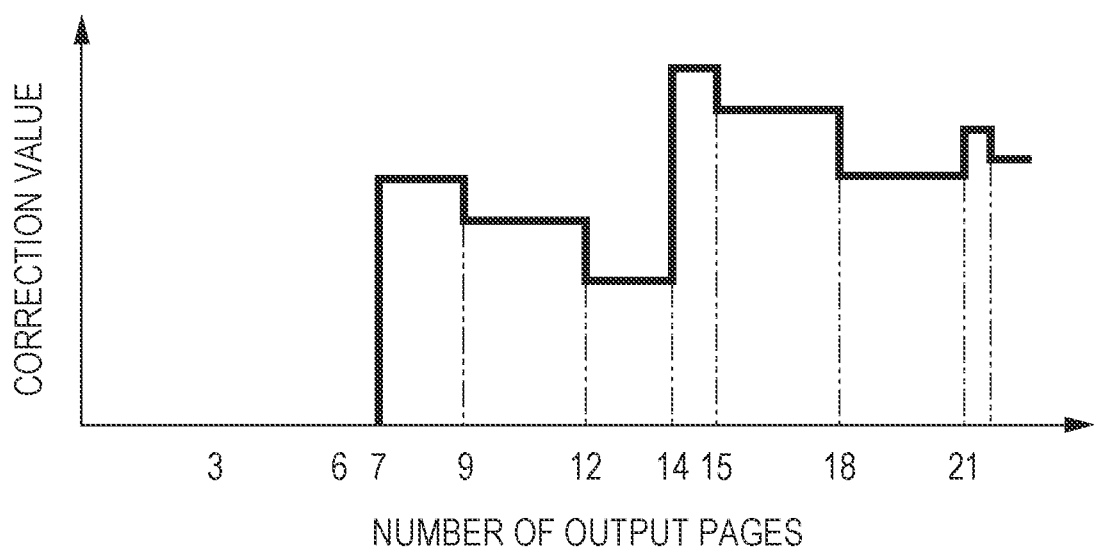
FIG. 8 illustrates an example of a change in the correction value.

FIG. 8 illustrates an example of a change in the updated correction value after the update process described above is performed. In FIG. 8, the correction value is represented in the vertical axis and the number of pages of recording medium on which image formation has been performed by the image forming unit 2 is represented in the horizontal axis. In the example illustrated in FIG. 8, it is assumed that the threshold Th2 is "7" and the threshold Th3 is "3".

In the example illustrated in FIG. 8, at the time when the number of output pages is "3", since the value of the counter CT2, which is "3", is not equal to or greater than the threshold Th2, which is "7", the correction value is not shifted toward the plus side. Meanwhile, at this time, since the value of the counter CT3, which is "3", is equal to or greater than the threshold Th3, which is "3", the correction value is shifted toward the minus side. However, since the correction value at the time when the number of output pages is "3" is "0", the correction value is maintained to be "0".

At the time when the number of output pages is "6", since the value of the counter CT2, which is "6", is not equal to or greater than the threshold Th2, which is "7", the correction value is not shifted toward the plus side. Meanwhile, at this time, since the value of the counter CT3, which is "3", is equal to or greater than the threshold Th3, which is "3", the correction value is shifted toward the minus side. However, since the correction value at this time is also "0", the correction value is maintained to be "0".

At the time when the number of output pages is "7", since the value of the counter CT2, which is "7", is equal to or greater than the threshold Th2, which is "7", the correction value is shifted toward the plus side. At this time, the shift amount for shifting the correction value toward the plus side is determined in accordance with the supply-amount-related value of developer to the developing device 24, as described above. Meanwhile, at the time when the number of output pages is "7", since the value of the counter CT3, which is "1", is not equal to or greater than the threshold Th3, which is "3", the correction value is not shifted toward the minus side.

At the time when the number of output pages is "9", since the value of the counter CT2, which is "2", is not equal to or greater than the threshold Th2, which is "7", the correction value is not shifted toward the plus side. Meanwhile, at this time, since the value of the counter CT3, which is "3", is equal to or greater than the threshold Th3, which is "3", the correction value is shifted toward the minus side. At this time, since the correction value has been shifted toward the plus side, the correction value is shifted toward the minus side by the supply-amount-related value of developer, as described above.

At the time when the number of output pages is "12", since the value of the counter CT2, which is "5", is not equal to or greater than the threshold Th2, which is "7", the correction value is not shifted toward the plus side. Meanwhile, at this time, since the value of the counter CT3, which is "3", is equal to or greater than the threshold Th3, which is "3", the correction value is shifted toward the minus side. At this time, since the correction value has been shifted toward the plus side, the correction value is shifted toward the minus side by the supply-amount-related value of developer.

Similarly, at the times when the number of output pages is "14" and "21", the correction value is shifted toward the plus side, and at the times when the number of output pages is "15" and "18", the correction value is shifted toward the minus side. When the number of output pages reaches "21", the correction value is first shifted toward the plus side, and immediately after that, the correction value is shifted toward the minus side.

The correction value updated by the update process according to this exemplary embodiment is changed, for example, as described above.

In the process for changing the correction value according to this exemplary embodiment described above, the correction value used for the process for controlling the toner-density-related value is changed in accordance with the supply-amount-related value of developer to the developing device 24. The correction value changed in accordance with the supply-amount-related value of developer is used for correcting the toner-density-related value in the process for controlling the toner-density-related value. That is, the toner-density-related value is corrected on the basis of the supply-amount-related value of developer to the developing device 24. This is for the purpose of correcting the toner-density-related value that is detected to be higher than the actual value due to an increase in the amount of charge between toner and carrier in the developer and a resultant increase in the void ratio in the developer. In this exemplary embodiment, attention is paid to the fact that the speed of deterioration of toner increases when the supply-amount-related value of developer is small. Thus, the difference between the detected toner-density-related value and the actual toner-density-related value is reduced by increasing the value to be used for correcting the toner-density-related value in the case of a smaller supply-amount-related value of developer and decreasing the value to be used for correcting the toner-density-related value in the case of a larger supply-amount-related value of developer.

In the process for changing the correction value, the interval between timings at which the correction value is shifted toward the plus side and the interval between timings at which the correction value is shifted toward the minus side differ from each other. More specifically, the interval between timings at which the correction value is shifted toward the plus side is set to be longer than the interval between timings at which the correction value is shifted toward the minus side. This is because the difference between the detected toner-density-related value and the actual toner-density-related value is slowly generated due to the deterioration of toner, and on the other hand, the dissolution of the difference is quickly achieved in accordance with the supply of developer. In this exemplary embodiment, in view of this phenomenon, the interval between timings at which the correction value is shifted toward the plus side is set to be long enough to take a long time to consider the supply-amount-related value of developer, and on the other hand, the interval between timings at which the correction value is shifted toward the minus side is set to be short enough to quickly achieve the dissolution of the difference.

Exemplary Modifications

Changes may be made to the exemplary embodiment described above, as described below. The exemplary modifications described below may be combined in an appropriate manner.

First Exemplary Modification

In the exemplary embodiment described above, in the case where the number of pages of recording medium on which image formation has been performed by the image forming unit 2 is equal to or greater than the threshold Th1, the toner-density-related value is corrected, and the supply of developer is controlled on the basis of the corrected value. However, these processes may be started after a predetermined time has passed.

In this case, the RAM of the control unit 1 may include a timer TM3, and when the value of the timer TM3 is equal to or greater than a threshold Th4, the process for correcting the toner-density-related value and the process for controlling the supply of developer may be performed. More specifically, for example, the timer TM3 of the control unit 1 may count the driving time of a driving motor (not illustrated) for driving the developing roller 242, and when the value indicating the driving time is equal to or greater than the threshold Th4, the processes described above may be performed.

In the exemplary embodiment described above, in the case where the number of pages of recording medium on which image formation has been performed by the image forming unit 2 is equal to or greater than the threshold Th2, the correction value is shifted toward the plus side. However, this processing may be started after a predetermined time has passed.

Furthermore, in the case where the number of pages of recording medium on which image formation has been performed by the image forming unit 2 is equal to or greater than the threshold Th3, the correction value is shifted toward the minus side. However, this processing may be started after a predetermined time has passed.

Second Exemplary Modification

In the exemplary embodiment described above, correction for subtracting the correction value from the toner-density-related value is performed, the difference between the corrected toner-density-related value and the desired toner-density-related value is calculated, and the supply-amount-related value of developer is calculated on the basis of the difference. That is, in the exemplary embodiment described above, the toner-density-related value is corrected. However, instead of the toner-density-related value, the desired toner-density-related value may be corrected to calculate the supply-amount-related value of developer. More specifically, the correction value may be added to the desired toner-density-related value to calculate the difference between the resultant desired toner-density-related value and the toner-density-related value (an uncorrected value), and the supply-amount-related value of developer may be calculated on the basis of the difference.

Third Exemplary Modification

In the exemplary embodiment described above, the correction value used for controlling the toner-density-related value is changed in accordance with the supply-amount-related value of developer to the developing device 24. However, the correction value may be changed in accordance with, instead of the supply-amount-related value of developer, the difference between the supply-amount-related value of developer and the consumption-amount-related value of developer. Hereinafter, the difference between the supply-amount-related value of developer and the consumption-amount-related value of developer (the value obtained by subtracting the consumption-amount-related value of developer from the supply-amount-related value of developer) is referred to as the "change amount of developer". This exemplary modification may be used when a difference occurs between a supply-amount-related value and a consumption-amount-related value, such as for the case where the consumptionamount-related value is calculated using the number of effective pixels and the supply-amount-related value is calculated using a value obtained by measuring the driving time of the dispensing motor.

In the image forming apparatus 100 according to this exemplary modification, the RAM of the control unit 1 includes counters CT4 and CT5, and the counters CT4 and CT5 count the number of effective pixels forming image data output to the exposure device 23. The control unit 1 identifies the consumption-amount-related value of developer by the developing device 24 by counting the number of effective pixels. The control unit 1 is an example of a "consumption-amount-related value identifying unit" according to an exemplary embodiment of the present invention. Here, the term "identifying" may represent an operation for acquiring a certain value by using various methods such as "calculating". The number of effective pixels is defined as described above.

Figure 9:
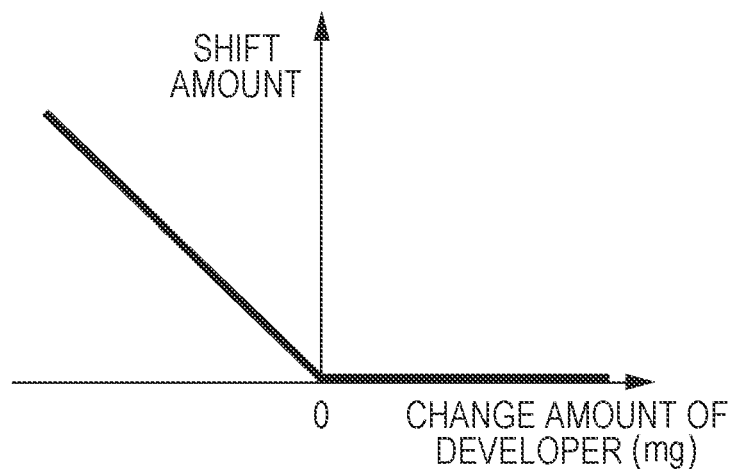
FIG. 9 illustrates an example of the relationship between the change amount of developer and the shift amount.

In the image forming apparatus 100 according to this exemplary modification, instead of the look up table LUT1, a look up table LUT3 is stored in the storage unit 5. In the look up table LUT3, the change amount of developer is associated with the shift amount for shifting the correction value toward the plus side. FIG. 9 illustrates an example of the relationship between the values stored in the look up table LUT3. As illustrated in FIG. 9, in the look up table LUT3, the change amount of developer and the shift amount exhibit a negative correlation until the change amount of developer reaches "0". After the change amount of developer reaches "0", the shift amount is maintained to be "0".

Figure 10:
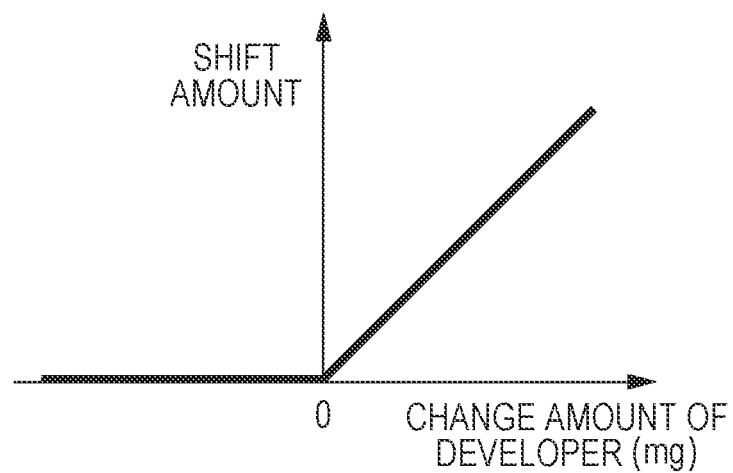
FIG. 10 illustrates an example of the relationship between the change amount of developer and the shift amount.

Furthermore, instead of the look up table LUT2, a look up table LUT4 is stored in the storage unit 5. In the look up table LUT4, the change amount of developer is associated with the shift amount for shifting the correction value toward the minus side. FIG. 10 illustrates an example of the relationship between the values stored in the look up table LUT4. As illustrated in FIG. 10, in the look up table LUT4, the shift amount is maintained to be "0" until the change amount of developer reaches "0". After the change amount of developer reaches "0", the shift amount increases as the change amount of developer increases.

Figure 11:
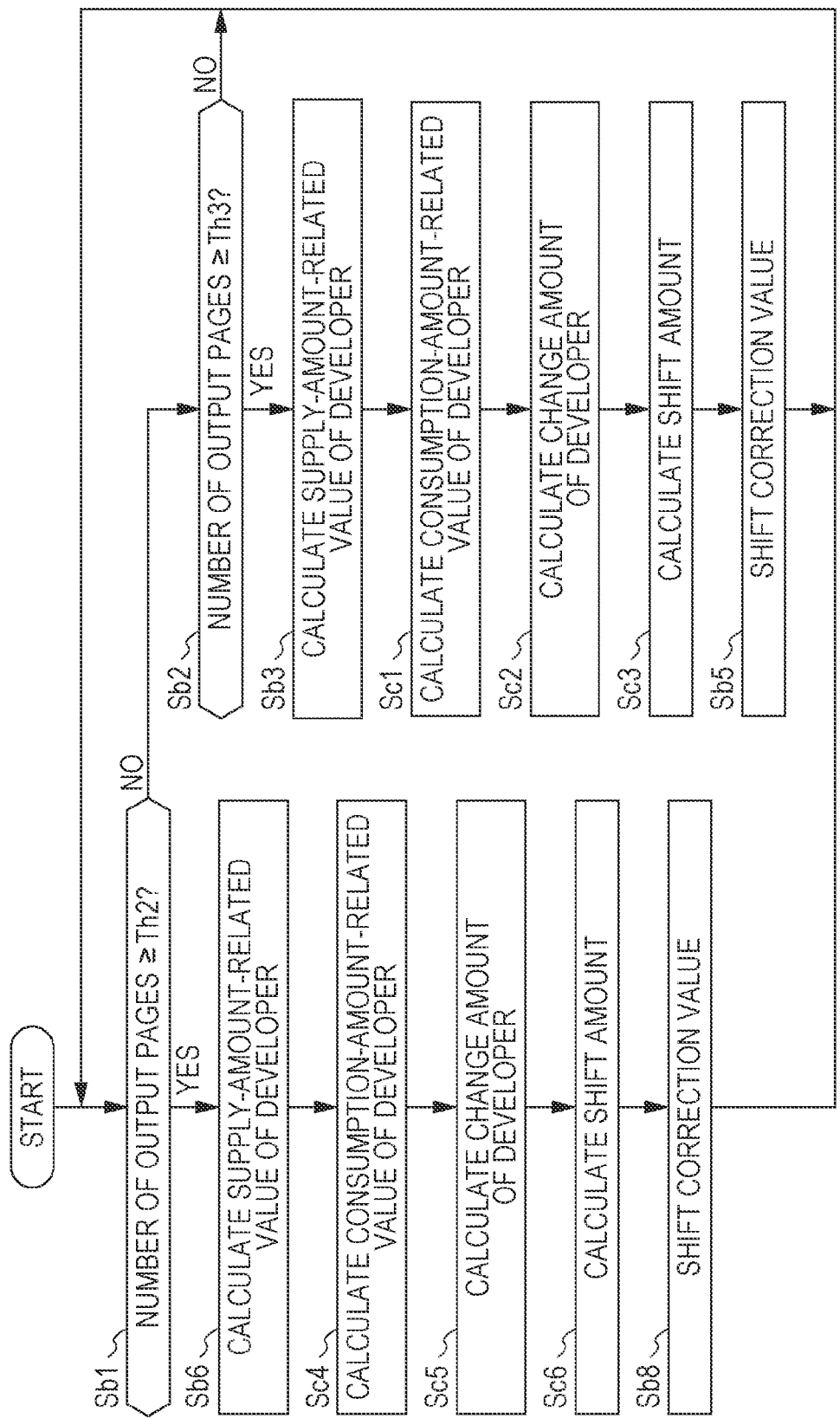
FIG. 11 is a flowchart illustrating a process for updating the correction value according to an exemplary modification.

A process for changing the correction value according to this exemplary modification will now be explained with reference to FIG. 11. In FIG. 11, the same processing steps as those in the process illustrated in FIG. 7 are referred to with the same reference numbers and the explanations of those same processing steps will be partly omitted.

In step Sb1, the control unit 1 determines whether or not the number of pages of recording medium on which image formation has been performed by the image forming unit 2 is equal to or greater than the threshold Th2 (step Sb1). If the determination is negative (NO in step Sb1), the control unit 1 determines whether or not the number of pages of recording medium on which image formation has been performed by the image forming unit 2 is equal to or greater than the threshold Th3 (step Sb2).

If the determination is negative (NO in step Sb2), the control unit 1 repeats the determination in step Sb1. If the determination is affirmative (YES in step Sb2), the control unit 1 calculates the supply-amount-related value of developer from the toner cartridge 25 to the developing device 24 (step Sb3). The control unit 1 also resets the counter CT3 and the timer TM1.

The control unit 1 calculates the consumption-amount-related value of developer by the developing device 24 (step Sc1). More specifically, the control unit 1 reads the integrated value of pixels forming an output image from the counter CT4 stored in the RAM of the control unit 1. Then, the control unit 1 multiplies the read integrated value by a predetermined coefficient C3 to calculate the consumption-amount-related value of developer by the developing device 24. The predetermined coefficient C3 is, for example, a coefficient stored in the storage unit 5, and is set in advance for calculating the consumption-amount-related value of developer from the integrated value of pixels forming an output image. The control unit 1 also resets the counter CT4.

The control unit 1 calculates the difference between the supply-amount-related value of developer calculated in step Sb3 and the consumption-amount-related value of developer calculated in step Sc1 (that is, the change amount of developer) (step Sc2). Then, the control unit 1 identifies the shift amount for shifting the correction value stored in the RAM toward the minus side (step Sc3). More specifically, the control unit 1 refers to the look up table LUT4 stored in the storage unit 5 to identify the shift amount corresponding to the value of the change amount of developer calculated in step Sc2.

The control unit 1 shifts the correction value stored in the RAM toward the minus side by the shift amount identified in step Sc3 (step Sb5). The correction value stored in the RAM is not less than 0.

If the determination in step Sb1 is affirmative (YES in step Sb1), the control unit 1 calculates the supply-amount-related value of developer from the toner cartridge 25 to the developing device 24 (step Sb6). The control unit 1 also resets the counter CT2 and the timer TM2. Then, the control unit 1 calculates the consumption-amount-related value of developer by the developing device 24 (step Sc4). More specifically, the control unit 1 reads the integrated value of pixels forming an output image from the counter CT5 stored in the RAM of the control unit 1. Then, the control unit 1 multiplies the read integrated value by the coefficient C3 to calculate the consumption-amount-related value of developer by the developing device 24. The control unit 1 also resets the counter CT5.

The control unit 1 calculates the difference between the supply-amount-related value of developer calculated in step Sb6 and the consumption-amount-related value of developer calculated in step Sc4 (that is, the change amount of developer) (step Sc5). Then, the control unit 1 identifies the shift amount for shifting the correction value stored in the RAM toward the plus side (step Sc6). More specifically, the control unit 1 refers to the look up table LUT3 stored in the storage unit 5 to identify the shift amount corresponding to the value of the change amount of developer calculated in step Sc5.

Then, the control unit 1 shifts the correction value stored in the RAM toward the plus side by the shift amount identified in step Sc6 (step Sb8).

The process for changing the correction value according to this exemplary modification is performed as described above.

In the process according to this exemplary modification, attention is paid to the fact that the speed of deterioration of toner increases in the case where the change amount of developer is minus. Thus, the difference between the detected toner-density-related value and the actual toner-density-related value is reduced by increasing the value for correcting the toner-density-related value in the case where the change amount of developer is minus and decreasing the value for correcting the toner-density-related value in the case where the change amount of developer is plus.

Fourth Exemplary Modification

In the exemplary embodiment described above, the shift amount for shifting the correction value toward the plus side and the shift amount for shifting the correction value toward the minus side may have different increasing rates with respect to the supply-amount-related value of developer. For example, by setting the increasing rate for the shift amount for shifting the correction value toward the minus side to be twice that for the shift amount for shifting the correction value toward the plus side, the correction value may be decreased at a higher speed.

In this case, the interval between timings at which the correction value is shifted toward the plus side and the interval between timings at which the correction value is shifted toward the minus side may be set to the same. In the exemplary embodiment described above, the correction value is caused to quickly reflect the dissolution of the difference between the detected toner-density-related value and the actual toner-density-related value by setting the interval between the timings at which the correction value is shifted toward the minus side to be shorter than the interval between the timings at which the correction value is shifted toward the plus side. However, the correction value may be caused to quickly reflect the dissolution of the difference between the detected toner-density-related value and the actual toner-density-related value by setting the interval between the timings at which the correction value is shifted toward the plus side to be the same as the interval between the timings at which the correction value is shifted toward the minus side and causing a difference between the increasing rate for the shift amount for shifting the correction value toward the plus side and the increasing rate for the shift amount for shifting the correction value toward the minus side.

Fifth Exemplary Modification

In the exemplary embodiment described above, the density sensor 245 provided in the developing device 24 measures the magnetic permeability of developer and outputs a signal indicating the measured magnetic permeability to the control unit 1, and the control unit 1 identifies the toner-density-related value inside the developing device 24 on the basis of the signal. However, the control unit 1 may employ the value of the magnetic permeability indicated by the signal as a value indicating the toner-density-related value, without identifying the toner-density-related value on the basis of the signal indicating the magnetic permeability. In this case, since the value of the magnetic permeability has a negative correlation with respect to the toner-density-related value, the control unit 1 may perform correction for adding the correction value to the toner-density-related value (the value of the magnetic permeability), instead of correction for subtracting the correction value from the toner-density-related value, in step Sa3 of the process for controlling the toner-density-related value. That is, the magnetic permeability measured by the density sensor 245 is an example of a "toner-density-related value" according to an exemplary embodiment of the present invention.

In the second exemplary modification described above, in the case where the value of the magnetic permeability is used as a value indicating the toner-density-related value, the supply-amount-related value of developer may be calculated, by instead of adding the correction value to the desired toner-density-related value, by subtracting the correction value from the desired toner-density-related value, calculating the difference between the resultant desired toner-density-related value and the toner-density-related value (an uncorrected value), and calculating the supply-amount-related value of developer on the basis of the difference.

Sixth Exemplary Modification

A program for a process for controlling the toner-density-related value or a process for updating the correction value according to the exemplary embodiment described above may be distributed in a state of being stored in a computer-readable recording medium, such as a magnetic recording medium (for example, a magnetic tape, a magnetic disk (including a hard disk drive (HDD) and a flexible disk (FD)), etc.), an optical recording medium (for example, an optical disc (including a compact disc (CD) and a digital versatile disk (DVD)), etc.), a magneto-optical recording medium, a semiconductor memory, and the like, and may be installed into the image forming apparatus 100. Alternatively, the program may be downloaded via a communication line and installed into the image forming apparatus 100.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device comprising:
a toner-density-related value identifying unit that identifies a toner-density-related value indicating a toner ratio in developer, wherein the developer includes toner and carrier, and the developer is contained in a developing unit of an image forming apparatus;
a supply-amount-related value identifying unit that identifies a supply-amount-related value of the developer supplied to the developing unit;
a correcting unit that corrects the toner-density-related value identified by the toner-density-related value identifying unit in accordance with a change to the supply-amount-related value identified by the supply-amount-related value identifying unit; and
a correction value updating unit that updates a correction value in accordance with the supply-amount-related value identified by the supply-amount-related value identifying unit,
wherein the correcting unit performs correction of the toner-density-related value by adding the updated correction value to the identified toner-density-related value or subtracting the updated correction value from the identified toner-density-related value,
wherein the supply-amount-related value identifying unit identifies the supply-amount-related value, supplied to the developing unit, in a first time interval, and identifies the supply-amount-related value, supplied to the developing unit, in a second time interval which is shorter than the first time interval, and
wherein the correcting unit increases the correction value in accordance with the supply-amount-related value identified in the first time interval and decreases the correction value in accordance with the supply-amount-related value identified in the second time interval.

2. The control device according to claim 1, further comprising:
a consumption-amount-related value identifying unit that identifies a consumption-amount-related value of the developer contained in the developing unit, wherein
the supply-amount-related value identifying unit estimates the supply-amount-related value on the basis of the consumption-amount-related value of the developer, and
the correction value updating unit updates the correction value in accordance with a difference between the supply-amount-related value identified by the supply-amount-related value identifying unit and the consumption-amount-related value identified by the consumption-amount-related value identifying unit.

3. The control device of claim 1, wherein the correcting unit corrects the toner-density-related value identified by the toner-density-related value identifying unit in accordance with the change of a value of the supplied developer in response to supply of the developer to the developing unit, wherein the value of the supplied developer is based on the supply-amount-related value identified by the supply-amount-related value identifying unit.

4. The control device of claim 1, wherein the toner-density-related value is a value of a magnetic permeability of developer.

5. A control method comprising:
identifying a toner-density-related value indicating a toner ratio in developer, wherein the developer includes toner and carrier, and the developer is contained in a developing unit of an image forming apparatus;
identifying a supply-amount-related value of the developer supplied to the developing unit;
correcting the identified toner-density-related value in accordance with a change to the identified supply-amount-related value; and
updating a correction value based on the identified supply-amount-related value of the developer,
wherein the correcting the identified toner-density-related value comprises adding the updated correction value to the identified toner-density-related value or subtracting the updated correction value from the identified toner-density-related value,
wherein the identifying the supply-amount-related value of the developer comprises identifying the supply-amount-related value of the developer, supplied to the developing unit, in a first time interval, and identifying the supply-amount-related value of the developer, supplied to the developing unit, in a second time interval which is shorter than the first time interval, and
wherein the correcting the identified toner-density-related value comprises increasing the correction value in accordance with the supply-amount-related value identified in the first time interval and decreasing the correction value in accordance with the supply-amount-related value identified in the second time interval.

6. The control method of claim 5, wherein the correcting the identified toner-density-related value comprises correcting the identified toner-density-related value in accordance with the change of a value of the supplied developer in response to supply of the developer to the developing unit, wherein the value of the supplied developer is based on the identified supply-amount-related value.

7. A control device comprising:
a supply-amount-related value identifying unit that identifies a supply-amount-related value of developer, wherein the developer includes toner and carrier supplied to a developing unit of an image forming apparatus;
a correcting unit that corrects a desired toner-density-related value indicating a desired toner ratio in the developer in accordance with a change to the supply-amount-related value identified by the supply-amount-related value identifying unit; and
a correction value updating unit that updates a correction value in accordance with the supply-amount-related value identified by the supply-amount-related value identifying unit,
wherein the correcting unit performs correction of the desired toner-density-related value by adding the updated correction value to the identified toner-density-related value or subtracting the updated correction value from the identified toner-density-related value,
wherein the supply-amount-related value identifying unit identifies the supply-amount-related value, supplied to the developing unit, in a first time interval, and identifies the supply-amount-related value, supplied to the developing unit, in a second time interval which is shorter than the first time interval, and
wherein the correcting unit increases the correction value in accordance with the supply-amount-related value identified in the first time interval and decreases the correction value in accordance with the supply-amount-related value identified in the second time interval.

8. A control device comprising:
one or more processors;
memory storing executable instructions that, when executed by the one or more processors, causes the one or more processors to perform the steps of:
identifying a toner ratio in developer, the developer including toner and carrier;
identifying a developer supply amount supplied to a developing unit which contains the developer;
correcting the toner ratio based on a change of the developer supply amount; and
updating a correction value based on the identified developer supply amount,
wherein the correcting the toner ratio comprises correcting the toner ratio by adding the updated correction value to the identified toner ratio or subtracting the updated correction value from the identified toner ratio,
wherein the identifying the developer supply amount comprises identifying the developer supply amount, supplied to the developing unit, in a first time interval, and identifying the developer supply amount, supplied to the developing unit, in a second time interval which is shorter than the first time interval, and
wherein the correcting the toner ratio comprises increasing the correction value in accordance with the developer supply amount identified in the first time interval and decreasing the correction value in accordance with the developer supply amount identified in the second time interval.

9. A control device comprising:
one or more processors;
memory storing executable instructions that, when executed by the one or more processors, causes the one or more processors to perform the steps of:
identifying a value of a magnetic permeability of developer, the developer including toner and carrier;
identifying a developer supply amount supplied to a developing unit which contains the developer;

correcting the value of the magnetic permeability of developer based on a change of the developer supply amount; and updating a correction value based on the identified developer supply amount, wherein the correcting the value of the magnetic permeability of developer comprises correcting the value of the magnetic permeability of developer by adding the updated correction value to the identified value of the magnetic permeability of developer or subtracting the updated correction value from the identified value of the magnetic permeability of developer, wherein the identifying the developer supply amount comprises identifying the developer supply amount, supplied to the developing unit, in a first time interval, and identifying the developer supply amount, supplied to the developing unit, in a second time interval which is shorter than the first time interval, and wherein the correcting the value of the magnetic permeability of developer comprises increasing the correction value in accordance with the developer supply amount identified in the first time interval and decreasing the correction value in accordance with the developer supply amount identified in the second time interval.

* * * * *